United States Patent
Lewis et al.

(10) Patent No.: US 11,377,613 B2
(45) Date of Patent: Jul. 5, 2022

(54) BRINE-TOLERANT LUBRICANTS AND METHODS FOR USING THE SAME

(71) Applicant: METSS Corp., Westerville, OH (US)

(72) Inventors: Adriane Lewis, Columbus, OH (US); Courtney Stankavich, Columbus, OH (US); Michelle L. Docter, Columbus, OH (US); Matthew Nilsen, Columbus, OH (US); Kenneth J. Heater, Delaware, OH (US)

(73) Assignee: METSS Corp., Westerville, OH (US)

( * ) Notice: Subject to any disclaimer, the term of this patent is extended or adjusted under 35 U.S.C. 154(b) by 0 days.

(21) Appl. No.: 17/205,370

(22) Filed: Mar. 18, 2021

(65) Prior Publication Data

US 2021/0292675 A1    Sep. 23, 2021

Related U.S. Application Data

(60) Provisional application No. 62/992,188, filed on Mar. 20, 2020.

(51) Int. Cl.
| | |
|---|---|
| *C10M 105/34* | (2006.01) |
| *C09K 8/08* | (2006.01) |
| *C10M 129/70* | (2006.01) |
| *C10M 169/04* | (2006.01) |
| *C10M 129/06* | (2006.01) |

(52) U.S. Cl.
CPC ............ *C10M 105/34* (2013.01); *C09K 8/08* (2013.01); *C10M 129/06* (2013.01); *C10M 129/70* (2013.01); *C10M 169/044* (2013.01); *C09K 2208/34* (2013.01); *C10M 2207/0215* (2013.01); *C10M 2207/2815* (2013.01)

(58) Field of Classification Search
CPC ............ C10M 105/34; C10M 173/00; C10M 169/044; C10M 129/70; C10M 129/06; C10M 2209/109; C10M 2209/108; C10M 2215/082; C10M 2207/2815; C10M 2207/0215; C10M 2219/024; C10M 2209/103; C09K 8/035; C09K 8/08; C09K 2208/34; C10N 2030/06; C10N 2030/24
See application file for complete search history.

(56) References Cited

U.S. PATENT DOCUMENTS

| | | | | |
|---|---|---|---|---|
| 6,204,227 | B1 * | 3/2001 | Rao | C10M 145/36 508/433 |
| 2003/0188864 | A1 * | 10/2003 | Boudreau | C09K 8/34 166/270.1 |
| 2014/0121137 | A1 * | 5/2014 | Andrecola | C09K 8/524 507/244 |
| 2014/0274843 | A1 | 9/2014 | Tindall et al. | |
| 2019/0040304 | A1 | 2/2019 | Holtsclaw et al. | |

OTHER PUBLICATIONS

International Search Report and Written Opinion issued in PCT/US21/22929, dated Jun. 30, 2021.
PubChem 'methyl 9-dodecenoate' Sep. 13, 2017 (Sep. 13, 2017) retrieved from <https://pubchem.ncbi.nlm.nih.gov/substance/341288328> entirety of document especially p. 1 Table 1.
Elevance 'Materials Compatibility 1200 Product Line' Jul. 13, 2016 (Jul. 13, 2016) retrieved from <https://elevance.com/wp-content/uploads/2017/08/Elevance-Clean-1200HT-and-Clean-1200XA-Compatibility-Bulletin.pdf> entirety of document especially p. 1 para 1-2.
Equilex Chemicals 'Elevance Clean 1200' Aug. 4, 2015 (Aug. 4, 2015) retrieved from <https://elevance.com/wp-content/uploads/2017/08/Elevance-Clean-1200HT-and-Clean-1200XA-Compatibility-Bulletin.pdf> entirety of document especially p. 1 para 1.
United Soybean Board '2015 Soy Products Guide' 2015, retrieved from https://engineering-purdue.edu/ABE/academics/competitions/soy_products_handbook> entirety of document especially p. 2 para 2; p. 3 col. 3 para 12.
Elevance 'An Introduction to Elevance Clean 1200' Copyright 2016, retrieved from <https://elevance.com/wp-content/uploads/2017/08/Elevance-Clean-1200-Sales-Deck.pdf> entirety of document especially p. 3 para 1; p. 7 Table 1.

* cited by examiner

*Primary Examiner* — Vishal V Vasisth
(74) *Attorney, Agent, or Firm* — Kern Kendrick, LLC; Benjamen E. Kern

(57) ABSTRACT

Brine-tolerant lubricants are provided. The brine-tolerant lubricants may comprise an oil component, a surfactant component, and, optionally, an additive component. In one aspect, the oil component comprises a fatty acid alkyl ester. In one aspect, the surfactant component comprises at least one of an alkoxylated fatty acid and an alkoxylated fatty alcohol. Also provided are methods for increasing the lubricity of a drilling fluid by contacting the drilling fluid with the brine-tolerant lubricants.

20 Claims, No Drawings

BRINE-TOLERANT LUBRICANTS AND METHODS FOR USING THE SAME

CROSS-REFERENCE TO RELATED APPLICATIONS

This application claims priority from U.S. Provisional Patent Application No. 62/992,188, filed on Mar. 20, 2020, which is incorporated by reference herein in its entirety.

BACKGROUND

The oil and gas industry has used brines for well drilling and well completions for more than 30 years. High-density brines have been found to have particular applicability in deep wells, such as those that descend 15,000 to 30,000 feet (4,500 to 10,000 meters). Examples of high-density brines include sodium chloride, potassium chloride, calcium chloride, sodium bromide, calcium bromide, zinc bromide, potassium formate, cesium formate, and sodium formate brines.

While high-density brines have been found to be functional in providing the lubricity and viscosity of a well treatment fluid under extreme shear, pressure, and temperature variances, they are often ineffective because they are unable to exhibit the constant lubricity that is required during high shear conditions.

During the operation of deep wells, extended reach wells, and high angle wells, brine-containing well treatment fluid must exhibit increased lubricity. The need for increased lubricity is most marked in those instances during wellbore cleanup, wireline operations, coil tubing operations, and running of production tubulars.

Various additives exist for use as lubricating agents in drilling fluids as well as completion fluids. Many of the existing additives are not, however, compatible with clear brines, drilling fluids, or completion fluids that have brine as a major component. In addition, many additives currently used as lubricating agents in drilling fluids, completion fluids, or both, have presented environmental concerns and tend to be costly.

A need exists for lubricating agents that may be used in brine-based drilling fluids, completion fluids, or both. Such lubricating agents need to lower torque and drag by reducing metal to metal friction; they need to be useful in the prevention of differential sticking of downhole tubulars; and they must be relatively environmentally friendly.

SUMMARY

In one aspect, a brine-tolerant lubricant is provided, the brine-tolerant lubricant comprising an oil component, a surfactant component, and, optionally, an additive component.

In one aspect, the oil component comprises a fatty acid alkyl ester. In one aspect, the surfactant component comprises at least one of an alkoxylated fatty acid and an alkoxylated fatty alcohol.

In one aspect, a brine-tolerant lubricant is provided, the brine-tolerant lubricant comprising, consisting of, or consisting essentially of: (A) an oil component comprising a fatty acid alkyl ester having the formula R1-C(O)—O—R2, wherein R1 is a saturated or unsaturated, linear or branched alkyl group having 11 to 23 carbon atoms, and R2 is a linear or branched alkyl group having 1 to 4 carbon atoms; and (B) a surfactant component comprising at least one of: (1) an alkoxylated fatty acid having the formula R1'—C(O)—(O—R3)$_X$—OH, wherein R1' is a saturated or unsaturated, linear or branched alkyl group having 11 to 23 carbon atoms, R3 is a linear or branched alkyl group having 1 to 4 carbon atoms, and X is a number from 3 to 25; and (2) an alkoxylated fatty alcohol having the formula R1"—(O—R3')$_{X'}$—OH, wherein R1" is a saturated or unsaturated, linear or branched alkyl group having 11 to 23 carbon atoms, R3' is a linear or branched alkyl group having 1 to 4 carbon atoms, and X' is a number from 3 to 25.

In another aspect, a method is provided for increasing the lubricity of a drilling fluid by contacting the drilling fluid with a brine-tolerant lubricant comprising, consisting of, or consisting essentially of: (A) an oil component comprising a fatty acid alkyl ester having the formula R1-C(O)—O—R2, wherein R1 is a saturated or unsaturated, linear or branched alkyl group having 11 to 23 carbon atoms, and R2 is a linear or branched alkyl group having 1 to 4 carbon atoms; and (B) a surfactant component comprising at least one of: (1) an alkoxylated fatty acid having the formula R1'—C(O)—(O—R3)$_X$—OH, wherein R1' is a saturated or unsaturated, linear or branched alkyl group having 11 to 23 carbon atoms, R3 is a linear alkyl group having 1 to 4 carbon atoms, and X is a number from 3 to 25; and (2) an alkoxylated fatty alcohol having the formula R1"—(O—R3')$_{X'}$—OH, wherein R1" is a saturated or unsaturated, linear or branched alkyl group having 11 to 23 carbon atoms, R3' is a linear or branched alkyl group having 1 to 4 carbon atoms, and X' is a number from 3 to 25.

DETAILED DESCRIPTION

I. Brine-Tolerant Lubricants

Brine-tolerant lubricants are provided. Generally, a brine-tolerant lubricant is a lubricant that can continue to perform well in the presence of substantial amounts of brine. The brine-tolerant lubricants comprise an oil component and a surfactant component.

As to the oil component, the brine-tolerant lubricants may comprise at least 90% by weight of a fatty acid alkyl ester having the formula R1-C(O)—O—R2, wherein R1 is a saturated or unsaturated, linear or branched alkyl group having 11 to 23 carbon atoms, and R2 is a linear alkyl group having 1 to 4 carbon atoms.

As to the surfactant component, the brine-tolerant lubricants comprise at least one of: (1) an alkoxylated fatty acid having the formula R1'—C(O)—(O—R3)$_X$—OH, wherein R1' is a saturated or unsaturated, linear or branched alkyl group having 11 to 23 carbon atoms, R3 is a linear alkyl group having 1 to 4 carbon atoms, and X is a number from 3 to 25; and (2) an alkoxylated fatty alcohol having the formula R1"—(O—R3')$_{X'}$—OH, wherein R1" is a saturated or unsaturated, linear or branched alkyl group having 11 to 23 carbon atoms, R3' is a linear or branched alkyl group having 1 to 4 carbon atoms, and X' is a number from 3 to 25.

The brine-tolerant lubricants may optionally further comprise an additive component.

A. Fatty Acids

A fatty acid is a carboxylic acid with a long aliphatic chain, which is either saturated or unsaturated. Most naturally occurring fatty acids have an unbranched chain of an even number of carbon atoms, from 4 to 28. Short-chain fatty acids are fatty acids with aliphatic tails of five or fewer carbons (e.g., butyric acid). Medium-chain fatty acids are fatty acids with aliphatic tails of 6 to 12 carbons. Long-chain fatty acids are fatty acids with aliphatic tails of 13 to 21 carbons. Very long-chain fatty acids are fatty acids with aliphatic tails of 22 or more carbons. Fatty acids may be synthesized by the hydrolysis of triglycerides, with the removal of glycerol. Generally, the fatty acid component can be obtained from, for example, the manufacture of vegetable oils, from wood pulp processing, from animal fats processing, and the like.

The fatty acid component of the brine-tolerant lubricant may be any fatty acid that is effective in providing a lubricating composition as described herein. Suitable fatty acids may be linear or branched, saturated or unsaturated. Suitable fatty acids may be medium chain, long chain, or very long chain fatty acids. Examples of suitable fatty acids include, but are not limited to, lauric acid, oleic acid, stearic acid, linoleic acid, linolenic acid, and the like, and combinations thereof. In one aspect, the brine-tolerant lubricants may comprise a plurality of different types of fatty acids having different chain lengths. In another aspect, the brine-tolerant lubricants may comprise a single type of fatty acid. In some aspects, the oil component and the surfactant component comprise the same fatty acid(s). In other aspects, the oil component and the surfactant component comprise wholly or partially different fatty acid(s).

In some aspects, the fatty acids are vegetable oil-derived. Examples of vegetable-derived oils comprise soybean oil, canola oil, corn oil, palm oil, peanut oil, coconut oil, sunflower oil, and tallow oil. These vegetable-derived oils comprise triacylglycerols having saturated fatty acids (e.g., palmitic acid (C16:0) and stearic acid (C18:0)) and unsaturated fatty acids (e.g., oleic acid (C18:1), linoleic acid (C18:2), and linolenic acid (C18:3)) esterified to glycerol.

In some aspects, the vegetable oil is soybean oil. Soybean oil has been shown to comprise mainly palmitic, oleic, and linoleic fatty acid. See Ramos et al., Bioresource Technology, 100, 261-268 (2009), the disclosure of which is incorporated herein by reference. In some aspects, the vegetable-oil derived fatty acid comprises at least 70% by weight of oleic and linoleic acid.

B. Fatty Acid Alkyl Esters

The oil component of the brine-tolerant lubricant comprises a fatty acid alkyl ester. The fatty acid alkyl ester may comprise at least about 70%, at least about 80%, at least about 90%, or at least about 92% or the brine-tolerant lubricant by weight, including from about 92% to about 96%. The alkyl group R1 may be linear or branched, saturated or unsaturated, and may range in size from 5 to 29 carbon atoms and any smaller range within those numbers. In some aspects, the alkyl group R1 has a size ranging from 7 to 27 carbon atoms, from 9 to 25 carbon atoms, from 11 to 23 carbon atoms, from 13 to 21 carbon atoms, or from 15 to 19 carbon atoms.

The fatty acid may be esterified with an alkyl group having from 1 to 4 carbon atoms such that R2 is a $C_1$-$C_4$ alkyl group. In some aspects, R2 is a methyl group, while in other aspects it is an ethyl group, a propyl group, or a butyl group.

In one aspect, the fatty acid alkyl ester comprises, consists of, or consists essentially of soy fatty acid methyl ester. In another aspect, the fatty acid alkyl ester further comprises coconut fatty acid methyl ester.

C. Alkoxylated Fatty Acids

The surfactant component of the brine-tolerant lubricant comprises an alkoxylated fatty acid having the formula R1'—C(O)—(O—R3)$_X$—OH. The alkyl group R1' may be linear or branched, saturated or unsaturated, and may range in size from 5 to 29 carbon atoms and any smaller range within those numbers. In some aspects, the alkyl group R1' has a size ranging from 7 to 27 carbon atoms, from 9 to 25 carbon atoms, from 11 to 23 carbon atoms, from 13 to 21 carbon atoms, or from 15 to 19 carbon atoms.

The alkoxylated portion of the alkoxylated fatty acid may be an oligomer of alkoxy groups, such as ethoxy, propoxy, or butoxy groups. More specifically, the alkoxylated portion of the alkoxylated fatty acid may comprise R3 as a C1-C4 alkyl group. In some aspects, R3 is an ethyl group.

In some aspects, X is a number from 3 to 25, which describes the number of repeating units in the alkoxy oligomer. In different aspects, X is a number from 3 to 20, from 5 to 15, or from 5 to 10. Methods for alkoxylating fatty acids are known to those skilled in the art. The alkoxylated fatty acid may make up from about 2 to about 25% by weight of the brine-tolerant lubricant, or any smaller range therein, including from about 2 to about 20%, about 2 to about 15%, about 2 to 10%, about 2 to 8%, about 4 to 8%, or about 5% by weight of the alkoxylated fatty acid.

In one aspect, the alkoxylated fatty acid comprises, consists of, or consists essentially of ethoxylated soy fatty acid.

D. Alkoxylated Fatty Alcohols

The surfactant component of the brine-tolerant lubricant comprises an alkoxylated fatty alcohol having the formula R1"—(O—R3')$_{X'}$—OH. The alkyl group R1" may be linear or branched, saturated or unsaturated, and may range in size from 5 to 29 carbon atoms and any smaller range within those numbers. In some aspects, the alkyl group R1" has a size ranging from 7 to 27 carbon atoms, from 9 to 25 carbon atoms, from 11 to 23 carbon atoms, or from 12 to 14 carbon atoms.

The alkoxylated portion of the alkoxylated fatty alcohol may be an oligomer of alkoxy groups, such as ethoxy, propoxy, or butoxy groups. More specifically, the alkoxylated portion of the alkoxylated fatty alcohol may comprise R3' as a $C_1$-$C_4$ alkyl group. In some aspects, R3' is an ethyl group.

In some aspects, X' is a number from 3 to 25, which describes the number of repeating units in the alkoxy oligomer. In different aspects, X' is a number from 3 to 20, from 3 to 15, or from 3 to 10. Methods for alkoxylating fatty alcohols are known to those skilled in the art. The alkoxylated fatty alcohol may make up from about 2 to about 25% by weight of the brine-tolerant lubricant, or any smaller range therein, including from about 2 to about 20%, about 2 to about 15%, about 2 to 10%, about 2 to 8%, about 4 to 8%, or about 5% by weight of the alkoxylated fatty alcohol.

In one aspect, the alkoxylated fatty alcohol comprises, consists of, or consists essentially of 24-3 ethoxylated linear alcohol.

E. Additives

The brine-tolerant lubricants may optionally further comprise an additive component. The additive may be selected from the group consisting of a viscosity modifier, a pour point depressant, a flow improver, an anti-static agent, an ashless antioxidant, an antifoam agent, an emulsifying agent, a corrosion inhibitor, an anti-wear agent, a seal swell agent, an anti-misting agent, a water-soluble lubricant, an organic solvent, a gel-breaking surfactant, and mixtures thereof. The additive may comprise from about 0 to about 10%, from about 1 to about 5%, or from about 2 to about 4%, and about 3% by weight of the brine-tolerant lubricant.

In some aspects, the additives may function as co-surfactants in addition to their normal role. Examples of additives comprise a fatty acid diethyl amine that also functions as an emulsifier, an antistatic agent, a viscosity booster, and a corrosion inhibitor, or a sulfurized vegetable fatty acid ester that also functions as a sulfur carrier. In one aspect, the additive may be comprised of the reaction product of coconut fatty acid and diethanolamine. In another aspect, the additive may be comprised of sulfurized vegetable fatty acid methyl ester.

Representative formulations suitable for use in the present invention may be those comprised of, consisting of, or consisting essentially of the formulations shown in Table 1.

TABLE 1

Representative Brine-Tolerant Lubricant Formulations

| Oil Component (92-96%) | Surfactant Component (2-8%) | Additive Component (0-6%) |
|---|---|---|
| Soy Fatty Acid Methyl Ester | 24-3 Ethoxylated linear alcohol | Cocamide Diethanolamine |
| Soy Fatty Acid Methyl Ester | 24-3 Ethoxylated linear alcohol | Sulfurized Vegetable Fatty Acid Methyl Ester |
| Soy Fatty Acid Methyl Ester/Coconut Fatty Acid Methyl Ester | 24-3 Ethoxylated linear alcohol | Cocamide Diethanolamine |
| Soy Fatty Acid Methyl Ester/Coconut Fatty Acid Methyl Ester | 24-3 Ethoxylated linear alcohol | Sulfurized Vegetable Fatty Acid Methyl Ester |
| Soy Fatty Acid Methyl Ester | Ethoxylated Soy Fatty Acid | Cocamide Diethanolamine |
| Soy Fatty Acid Methyl Ester | Ethoxylated Soy Fatty Acid | Sulfurized Vegetable Fatty Acid Methyl Ester |
| Soy Fatty Acid Methyl Ester | Ethoxylated Soy Fatty Acid | None |

II. Methods for Increasing Lubricity of a Drilling Fluid

Methods are provided for increasing the lubricity of a drilling fluid. The methods may comprise contacting the drilling fluid with a brine-tolerant lubricant comprising: at least 90% by weight of a fatty acid alkyl ester having the formula R1-C(O)—O—R2, wherein R1 is a saturated or unsaturated, linear or branched alkyl group having 11 to 23 carbon atoms, and R2 is a $C_1$-$C_4$ alkyl group: and an alkoxylated fatty acid having the formula R1'—C(O)—(O—R3)$_X$—OH, wherein R1' is a saturated or unsaturated, linear or branched alkyl group having 11 to 23 carbon atoms, R3 is a $C_1$-$C_4$ alkyl group, and X a number from 3 to 25.

The method for increasing lubricity of a drilling fluid can make use of any of the brine-tolerant lubricants described herein. For example, in some aspects, the brine-tolerant lubricant comprises fatty acids in which R1 and R1' are each independently an unsaturated linear alkyl group having 15 to 19 carbon atoms, and the value of X for the alkoxylated fatty acid is a number from 5 to 15, and, optionally, the brine-tolerant lubricant further comprises from 2% to 4% by weight of an additive.

The lubricating agent may be used to reduce the coefficient of friction or to increase the lubricity of a brine-based drilling fluids. The amount of brine-tolerant lubricant used is typically that amount that is sufficient to reduce metal-metal friction. For instance, an amount of brine-tolerant lubricant sufficient to reduce the friction between the drilling string and the casing string of a wellbore when used to reduce the coefficient of friction of a drilling fluid.

Drilling fluid is a fluid typically used to aid the drilling of boreholes into the earth. Drilling fluid is used while drilling oil and natural gas wells and on exploration drilling rigs, but is also used for much simpler boreholes, such as water wells. The drilling fluid can be a water-based drilling fluid that includes fresh water, sea water, brine, mixtures of water and water-soluble organic compounds, and mixtures thereof. In some aspects, the drilling fluid also includes a substantial amount of oil. The main function of the drilling fluid is to provide hydrostatic pressure to prevent formation fluids from entering into the well bore, keeping the drill bit cool and clean during drilling, carrying out drill cuttings, and suspending the drill cuttings while drilling is paused. See "The Drilling Fluids Processing Handbook," by the ASME Shale Shaker Committee, Gulf Professional Publishing (2005), the disclosure of which is incorporated herein by reference.

The brine-tolerant lubricant may be contacted with a drilling fluid by any method known in the art, including by mixing, to provide a lubricated drilling mud comprising the brine-tolerant lubricant. The brine-tolerant lubricant also may be added to a drilling fluid during well intervention operations, drilling operations, completion operations, and fracturing operations by a method known to those skilled in the art. For example, the brine-tolerant lubricant may be injected into the pump suction or may be added to a mud pit. In some aspects, the brine-tolerant lubricant is added intermittently to maintain the lubricity of the drilling fluid. The lubricated drilling mud may be circulated in the wellbore during drilling.

Examples of suitable drilling fluids include, but are not limited to, drilling fluids, drill-in fluids, completion fluids, and the like, and combinations thereof. In some aspects, the method further comprises the step of circulating the drilling fluid including the brine-tolerant lubricant in a wellbore during drilling.

In some aspects, the drilling fluid comprises brine. The brine-tolerant lubricant described herein is effective in substantially increasing the lubricity or reducing the coefficient of friction of drilling fluids, such as brine-based drilling fluids. Brine is a high-concentration solution of salt in water and is a common byproduct of oil extraction. Brine commonly includes chloride and/or bromide salts of sodium, potassium, calcium, and zinc, but can also include potassium formate, cesium formate and sodium formate salts. In some aspects, the brine comprises a salt selected from the group consisting of NaCl, CaCl2, CaBr2, KCl, and mixtures thereof.

As used herein, brine may refer to salt solutions ranging from about 3.5% (a typical concentration of seawater) up to about 26% (a typical saturated salt solution, depending on temperature). In some aspects, drilling fluids contain high-density brines. A high-density brine may include a brine having a density greater than about 8.4 pounds/gallon (ppg) (greater than about 1.0 kg/1), more typically from about 8.4 to about 22.5 ppg (from about 1.0 to about 2.7 kg/1), even more typically from about 9.0 to about 22.0 ppg (from about 1.1 to about 2.6 kg/1).

The method comprises the step of contacting the drilling fluid with the brine-tolerant lubricant. Contacting refers to bringing the brine-tolerant lubricant and the drilling fluid into physical contact with one another, such as by mixing. The lubricating agent may be added directly to the drilling fluid or may be formulated in an aqueous fluid, which is then added to the brine of the drilling fluid. The amount of brine-tolerant lubricant added to the drilling fluid typically represents a small proportion of the drilling fluid overall. In some aspects, the drilling fluid comprises from 0.2% to 10% of the brine-tolerant lubricant by volume, while in further aspects, from 0.2% to 5% or from 0.1 to 2% of the drilling fluid is brine-tolerant lubricant.

The method is useful for increasing the lubricity of a drilling fluid. Testing has demonstrated that use of a 0.2% fraction of the brine-tolerant lubricant in the drilling fluid provides a 90% reduction in torque in a 4% CaCl2 brine. The measured coefficient of friction (COF) values ranged from 0.04 to 0.07. Torque reduction performance and COF values were maintained after 16 hours of hot rolling at 400° F. Accordingly, in some aspects, the brine-tolerant lubricant provides a torque reduction of 90% or more during drilling. In further aspects, a torque reduction of 95% or more, or 99% or more, during drilling is provided.

The brine-tolerant lubricant may reduce at least one property, such as but not limited to friction, torque, drag, wear, operating temperatures of the first surface, corrosion of the first surface, and combinations thereof when the first surface contacts a second surface different from the first surface. The first surface may be or include, but is not limited to a wellbore casing, a drill string, a pipe, a formation, a drill bit, a metal surface within a mud motor, formation evaluation tool, at least one drilling tool, a coiled tubing, and combinations thereof.

The brine-tolerance lubricant may be formulated using renewal materials that are sustainable and safe for the environment. The lubricant readily mixes with high-brine solutions to form a stable, low-foam lubricating emulsion that may be used for a significant period of time (e.g., 24 to 48 hours) after mixing. The superior performance of the brine-tolerant lubricant allows it to be used at fractional amounts compared to other products, reducing the cost of wellhead operations and supporting logistics. Lower use rates also reduce the potential for antagonistic interactions with other oilfield chemicals, though higher concentration levels have not demonstrated any adverse effects.

The following examples are included for purposes of illustration and are not intended to limit the scope of the invention.

EXAMPLES

Example 1: Brine Compatibility of Brine-Tolerant Lubricants

The brine compatibilities of the two representative brine-tolerant lubricants disclosed in Table 1 were tested and are re-displayed in Table 2.

TABLE 2

Formulations (DHL036 and DHL037-1875-100)

| DHL036 | | DHL037-1875-100 | |
| --- | --- | --- | --- |
| Oil Component | %/wt | Oil Component | %/wt |
| Soy fatty acid methyl ester | 92-96 | Soy fatty acid methyl ester/coconut fatty acid methyl ester | 92-96 |
| Surfactant Component | %/wt | Surfactant Component | %/wt |
| 24-3 Ethoxylated linear alcohol | 2-6 | 24-3 Ethoxylated linear alcohol | 2-6 |
| Additive Component | %/wt | Additive Component | %/wt |
| Cocamide/diethanolamine | 2-4 | Sulfurized vegetable fatty acid methyl ester | 2-4 |

The testing protocol for brine compatibility was as follows: Five brine solutions were prepared: (1) 10.04 ppg NaCl Brine; (2) 9.60 ppg CaCl2 Brine; (3) 11.0 ppg CaBr2 Brine; (4) 8.87 ppg KCl Brine; and (5) 8.55 ppg Seawater (ASTM D1141-98). Each brine solution was evaluated for compatibility with each lubricant. Each 250 mL fluid is mixed on a Hamilton Beach mixer at approximately 8,000 RPM. NaOH was added incrementally until the pH was approximately 10.5. Each fluid was poured into a bottle and observed after 30 min. The procedure was repeated, adding 10.0 ml of mineral oil slowly to the blender. Vortex of the blending fluid was observed to determine if the solution thickened, which is an indication of emulsion formation. The blender was stopped, and the solution was poured into a bottle and observed after an additional 30 min. Further observation was sometimes conducted at 24 hours. Any precipitants, emulsions, or other behaviors were noted.

The results are shown in Tables 3-7 below:

TABLE 3

Brine Tolerance in NaCl

| Lubricant | DHL036 | DHL037-1875-100 |
| --- | --- | --- |
| 10.04 ppg NaCl Brine + 5% Brine-Tolerant Lubricant | | |
| pH | 10.49 | 10.61 |
| Initial Observations | | |
| Precipitation (yes/no) | no | no |
| Foam Layer (yes/no) | yes | yes |
| Brine Appearance | very opaque | very opaque |
| Observations After 30 minutes | | |
| Precipitation (yes/no) | no | no |
| Foam Layer (yes/no) | yes | yes |
| Emulsion (yes/no) | yes | yes |
| Brine Appearance | moderately opaque | slightly opaque |
| 10.04 ppg NaCl Brine + 5% Brine-Tolerant Lubricant + 10 mL Mineral Oil | | |
| Initial Observations | | |
| Precipitation (yes/no) | no | no |
| Viscosity Change (yes/no) | no | no |
| Emulsion (yes/no) | yes | yes |
| Brine Appearance | moderately opaque | moderately opaque |
| Observations After 30 minutes | | |
| Precipitation (yes/no) | no | no |
| Oil Layer (yes/no) | yes | yes |
| Foam Layer (yes/no) | yes | yes |
| Emulsion (yes/no) | yes-slight | yes-slight |
| Brine Appearance | slightly opaque | slightly opaque |

Table 3 shows that both brine-tolerant lubricants produced a stable emulsion, free from precipitation, and without changing the fluid viscosity.

TABLE 4

Brine Tolerance in CaCl$_2$

| Lubricant | DHL036 | DHL037-1875-100 |
|---|---|---|
| 9.60 ppg CaCl$_2$ Brine + 5% Brine-Tolerant Lubricant | | |
| pH | 10.44 | 10.58 |
| *Initial Observations* | | |
| Precipitation (yes/no) | no | no |
| Foam Layer (yes/no) | yes-slight | yes-slight |
| Brine Appearance | very opaque | very opaque |
| *Observations After 30 minutes* | | |
| Precipitation (yes/no) | no | no |
| Foam Layer (yes/no) | slight | slight |
| Emulsion (yes/no) | yes | yes |
| Brine Appearance | very opaque | very opaque |
| 9.60 ppg CaCl$_2$ Brine + 5% Brine-Tolerant Lubricant + 10 mL Mineral Oil | | |
| *Initial Observations* | | |
| Precipitation (yes/no) | no | no |
| Viscosity Change (yes/no) | yes-slight | yes-slight |
| Emulsion (yes/no) | yes | yes |
| Brine Appearance | very opaque | very opaque |
| *Observations After 30 minutes* | | |
| Precipitation (yes/no) | no | no |
| Oil Layer (yes/no) | yes | yes |
| Foam Layer (yes/no) | yes | yes |
| Emulsion (yes/no) | yes | yes |
| Brine Appearance | very opaque | very opaque |

Table 4 shows that both brine-tolerant lubricants produced a stable emulsion, free from precipitation and with only a slight change in fluid viscosity.

TABLE 5

Brine Tolerance in CaBr$_2$

| Lubricant | DHL036 | DHL037-1875-100 |
|---|---|---|
| 11.0 ppg CaBr$_2$ Brine + 5% Brine-Tolerant Lubricant | | |
| pH | 10.59 | 10.51 |
| *Initial Observations* | | |
| Precipitation (yes/no) | no | no |
| Foam Layer (yes/no) | yes | yes |
| Brine Appearance | moderately opaque | moderately opaque |
| *Observations After 30 minutes* | | |
| Precipitation (yes/no) | no | no |
| Foam Layer (yes/no) | yes | no |
| Emulsion (yes/no) | yes | yes |
| Brine Appearance | moderately opaque | moderately opaque |
| 11.0 ppg CaBr$_2$ Brine + 5% Brine-Tolerant Lubricant + 10 mL Mineral Oil | | |
| *Initial Observations* | | |
| Precipitation (yes/no) | no | no |
| Viscosity Change (yes/no) | no | no |
| Emulsion (yes/no) | yes | yes |
| Brine Appearance | moderately opaque | moderately opaque |
| *Observations After 30 minutes* | | |
| Precipitation (yes/no) | no | no |
| Oil Layer (yes/no) | no | no |
| Foam Layer (yes/no) | yes | yes |
| Emulsion (yes/no) | yes | yes |
| Brine Appearance | moderately opaque | moderately opaque |

Table 5 shows that both brine-tolerant lubricants produced a stable emulsion, free from precipitation and with no change in fluid viscosity.

TABLE 6

Brine Tolerance in KCl

| Lubricant | DHL036 | DHL037-1875-100 |
|---|---|---|
| 8.87 ppg KCl Brine + 5% Brine-Tolerant Lubricant | | |
| pH | 10.50 | 10.55 |
| *Initial Observations* | | |
| Precipitation (yes/no) | no | no |
| Foam Layer (yes/no) | yes-moderate | yes |
| Brine Appearance | very opaque | very opaque |
| *Observations After 30 minutes* | | |
| Precipitation (yes/no) | no | no |
| Foam Layer (yes/no) | yes | yes |
| Emulsion (yes/no) | yes | yes |
| Brine Appearance | very opaque | very opaque |
| 8.87 ppg KCl Brine + 5% Brine-Tolerant Lubricant + 10 mL Mineral Oil | | |
| *Initial Observations* | | |
| Precipitation (yes/no) | no | no |
| Viscosity Change (yes/no) | yes-slight | yes-slight |
| Emulsion (yes/no) | yes | yes |
| Brine Appearance | very opaque | very opaque |
| *Observations After 30 minutes* | | |
| Precipitation (yes/no) | no | no |
| Oil Layer (yes/no) | yes | yes |
| Foam Layer (yes/no) | yes | yes |
| Emulsion (yes/no) | yes | yes |
| Brine Appearance | very opaque | very opaque |

Table 6 shows that both brine-tolerant lubricants produced a stable emulsion, free from precipitation and with only a slight change in fluid viscosity.

TABLE 7

Brine Tolerance in Seawater

| Lubricant | DHL036 | DHL037-1875-100 |
|---|---|---|
| 8.55 ppg Seawater + 5% Brine-Tolerant Lubricant | | |
| pH | 10.62 | 10.58 |
| *Initial Observations* | | |
| Precipitation (yes/no) | yes-slight | yes-slight |
| Foam Layer (yes/no) | yes-moderate | yes-slight |
| Brine Appearance | very opaque | very opaque |
| *Observations After 30 minutes* | | |
| Precipitation (yes/no) | yes-slight | yes-slight |
| Foam Layer (yes/no) | yes | yes |
| Emulsion (yes/no) | yes | yes |
| Brine Appearance | very opaque | very opaque |
| 8.55 ppg Seawater + 5% Brine-Tolerant Lubricant + 10 mL Mineral Oil | | |
| *Initial Observations* | | |
| Precipitation (yes/no) | yes-slight | yes-slight |
| Viscosity Change (yes/no) | yes-slight | yes-slight |
| Emulsion (yes/no) | yes | yes |
| Brine Appearance | moderately opaque, excessive foam | moderately opaque, excessive foam |
| *Observations After 30 minutes* | | |
| Precipitation (yes/no) | yes-slight | yes-slight |
| Oil Layer (yes/no) | yes | yes |
| Foam Layer (yes/no) | yes-major | yes-major |
| Emulsion (yes/no) | yes-slight | yes-slight |
| Brine Appearance | moderately opaque | moderately opaque |

Table 7 shows that brine-tolerant lubricants produced a stable emulsion, free from precipitation and with only a slight change in fluid viscosity.

Example 2: Lubricity of Brine-Tolerant Lubricants

Lubricities of four representative brine-tolerant lubricants disclosed in Table 1 were tested and are re-displayed in Table 8.

TABLE 8

Formulations (DHL036, DHL037, DHL037-1875-50, and DHL037-1875-100)

| DHL036 | | DHL037-1875-100 | | DHL037 | | DHL037-1875-50 | |
|---|---|---|---|---|---|---|---|
| Oil Component | %/wt | Oil Component | %/wt | Oil Component | %/wt | Oil Component | %/wt |
| Soy Fatty Acid Methyl Ester | 92-96 | Soy Fatty Acid Methyl Ester/ Coconut Fatty Acid Methyl Ester | 92-96 | Soy Fatty Acid Methyl Ester | 92-96 | Soy Fatty Acid Methyl Ester/ Coconut Fatty Acid Methyl Ester | 92-96 |
| Surfactant Component | %/wt | Surfactant Component | %/wt | Surfactant Component | %/wt | Surfactant Component | %/wt |
| 24-3 Ethoxylated linear alcohol | 2-6 | 24-3 Ethoxylated linear alcohol | 2-6 | 24-3 Ethoxylated linear alcohol | 2-6 | 24-3 Ethoxylated linear alcohol | 2-6 |
| Additive Component | %/wt | Additive Component | %/wt | Additive Component | %/wt | Additive Component | %/wt |
| Cocamide Diethanolamine | 2-4 | Sulfurized Vegetable Fatty Acid Methyl Ester | 2-4 | Sulfurized Vegetable Fatty Acid Methyl Ester | 2-4 | Sulfurized Vegetable Fatty Acid Methyl Ester | 2-4 |

The brine-tolerant lubricants were added to a 4% $CaCl_2$ brine at specified concentrations. All fluids were mixed on a Sterling MultiMixer for 10 min at approximately 11,500 RPM prior to testing.

The procedure used for the lubricity testing included the following steps: First, calibration was carried out. For calibration, a steel lubricity test ring and block were mounted on an OFITE® OFI Lubricity Meter. A test ring and block were submerged in deionized water. The motor speed was set to 60 RPM and torque to 150 inch-pounds, and the motor was run for 5 min. The water was removed, and the assembly was dried.

For the next step, the motor speed was set to 60 rpm and let run for 15 min. The torque reading was zeroed. The unit was run approximately 5 more min, and the torque reading was zeroed again, if required. A stainless-steel sample cup was filled with brine-tolerant lubricant (260-280 mL) and place on the lowered cup stand. The cup stand was raised until the test ring, test block, and block holder were fully submerged. The thumbscrew was tightened to secure the cup stand. The torque reading was zeroed.

The torque arm was positioned so that it fit inside the concave portion of the torque arm clamp. Torque was applied to 150 inch-pounds and run for 5 min. Torque readings were recorded. The correction factor was determined by the initial water calibration. The results are shown in Table 9, below:

TABLE 9

Lubricity Testing of Brine-Tolerant Lubricants

| Base Fluid | Brine-Tolerant Lubricant | Torque Reading | DI Water Reading | Correction Factor | Coef. of Friction |
|---|---|---|---|---|---|
| 4% $CaCl_2$ Brine | 0.2% Vol. DHL036 | 5.1 | 33.5 | 1.01 | 0.052 |
| 4% $CaCl_2$ Brine | 1.0% Vol. DHL036 | 7.1 | 33.5 | 1.01 | 0.072 |
| 4% $CaCl_2$ Brine | 1.0% Vol. DHL037 | 7.1 | 33.5 | 1.01 | 0.072 |
| 4% $CaCl_2$ Brine | 1.0% Vol. DHL037-1875-50 | 6.5 | 33.5 | 1.01 | 0.066 |
| 4% $CaCl_2$ Brine | 1.0% Vol. DHL037-1875-100 | 5.9 | 33.5 | 1.01 | 0.060 |

Table 9 shows that the addition of the brine-tolerant lubricants yielded excellent coefficient of friction values (0.052-0.072) relative to industry-acceptable values (<0.1).

Example 3: Lubricity and Temperature Stability of Brine-Tolerant Lubricants

Lubricity and temperature stability of the brine-tolerant lubricants of Table 1 were tested. The lubricity testing was conducted as described in Example 2. The temperature stability was tested by placing the brine+ brine-tolerant lubricant emulsion in a roller oven at either 300° F. or 400° F. for 16 hours. The emulsion was observed for stability and tested again for lubricity. The results are shown are Table 10 and Table 11.

TABLE 10

Lubricity and 300° F. Temperature Stability of Brine-Tolerant Lubricants

| Base Fluid | Brine-Tolerant Lubricant | Aging at 300° F. | Torque Reading | DI Water Reading | Corr. Factor | Coef. of Friction |
|---|---|---|---|---|---|---|
| 4% CaCl₂ Brine | 0.2% Vol. DHL036 | 16 hours | 2.7 | 34.1 | 1.00 | 0.027 |
| 4% CaCl₂ Brine | 0.2% Vol. DHL037-1875-100 | 0 hours | 5.2 | 34.1 | 1.00 | 0.052 |
| 4% CaCl₂ Brine | 0.2% Vol. DHL037-1875-100 | 16 hours | 4.6 | 34.1 | 1.00 | 0.046 |

TABLE 11

Lubricity and 400° F. Temperature Stability of Brine-Tolerant Lubricants

| Base Fluid | Brine-Tolerant Lubricant | Aging at 400° F. | Torque Reading | DI Water Reading | Corr. Factor | Coef. of Friction |
|---|---|---|---|---|---|---|
| 4% CaCl₂ Brine | 0.2% Vol. DHL036 | 16 hours | 3.6 | 34.2 | 0.99 | 0.036 |
| 4% CaCl₂ Brine | 0.2% Vol. DHL037-1875-100 | 16 hours | 5.8 | 34.2 | 0.99 | 0.057 |

Table 10 and Table 11 show that the brine-tolerant lubricants are temperature stable, i.e., they did not degrade in high temperature over the time tested such that the emulsions were de-stabilized or the lubricious properties were harmed. Specifically, the addition of the brine-tolerant lubricants yielded excellent coefficient of friction values (0.027-0.072) relative to industry-acceptable values (<0.1).

Unless defined otherwise, all technical and scientific terms used herein have the same meaning as commonly understood by one of ordinary skill in the art to which this invention belongs.

Where a range of values is provided, each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

The term "about" in conjunction with a number is intended to include ±10% of the number. This is true whether "about" is modifying a stand-alone number or modifying a number at either or both ends of a range of numbers. In other words, "about 10" means from 9 to 11. Likewise, "about 10 to about 20" contemplates 9 to 22 and 11 to 18. In the absence of the term "about," the exact number is intended. In other words, "10" means 10.

The singular forms "a", "and", and "the" include plural referents (and may be read equivalently to such phrases as "one or more" and "at least one") unless the context clearly dictates otherwise. Thus, for example, reference to "a saturated or unsaturated, linear or branched alkyl group" also includes a plurality of such groups, and so forth.

The transitional phrase "consisting essentially of" limits the scope of a claim to the specified materials or steps "and those that do not materially affect the basic and novel characteristic(s)" of the claimed invention. MPEP § 2111.03 (III.).

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A brine-tolerant lubricant, comprising:
    (A) 92-96% of an oil component consisting essentially of soy fatty acid methyl ester, coconut fatty acid methyl ester, or a combination thereof; and
    (B) 2-8% of a surfactant component consisting essentially of 24-3 ethoxylated linear alcohol, ethoxylated soy fatty acid, or a combination thereof; and,
    (C) up to 6% of an additive component consisting essentially of cocamide diethanolamine, sulfurized vegetable fatty acid methyl ester, or a combination thereof.

2. A method for increasing the lubricity of a drilling fluid, comprising contacting the drilling fluid with a brine-tolerant lubricant, the brine-tolerant lubricant comprising: (A) 92-96% of an oil component consisting essentially of soy fatty acid methyl ester, coconut fatty acid methyl ester, or a combination thereof; and (B) 2-8% of a surfactant component consisting essentially of 24-3 ethoxylated linear alcohol, ethoxylated soy fatty acid, or a combination thereof; and, optionally, (C) up to 6% of an additive component consisting essentially of cocamide diethanolamine, sulfurized vegetable fatty acid methyl ester, or a combination thereof.

3. The method of claim 2, wherein the drilling fluid comprises brine.

4. The method of claim 2, wherein the drilling fluid comprises from 0.2% to 10% of the brine-tolerant lubricant by volume.

5. The method of claim 2, wherein the method further comprises the step of circulating the drilling fluid including the brine-tolerant lubricant in a wellbore during drilling.

6. The brine-tolerant lubricant of claim 1, wherein the oil component consists essentially of soy fatty acid methyl ester.

7. The brine-tolerant lubricant of claim 1, wherein the oil component consists essentially of coconut fatty acid methyl ester.

8. The brine-tolerant lubricant of claim 1, wherein the oil component consists essentially of a combination of soy fatty acid methyl ester and coconut fatty acid methyl ester.

9. The brine-tolerant lubricant of claim 1, wherein the surfactant component consists essentially of 24-3 ethoxylated linear alcohol.

10. The brine-tolerant lubricant of claim 1, wherein the surfactant component consists essentially of ethoxylated soy fatty acid.

11. The brine-tolerant lubricant of claim 1, wherein the surfactant component consists essentially of a combination of 24-3 ethoxylated linear alcohol and ethoxylated soy fatty acid.

12. The brine-tolerant lubricant of claim 1, wherein the brine-tolerant lubricant includes the additive component, and the additive component consists essentially of cocamide diethanolamine.

13. The brine-tolerant lubricant of claim 1, wherein the brine-tolerant lubricant includes the additive component, and the additive component consists essentially of sulfurized vegetable fatty acid methyl ester.

14. The brine-tolerant lubricant of claim 1, wherein the brine-tolerant lubricant includes the additive component, and the additive component consists essentially of a combination of cocamide diethanolamine and sulfurized vegetable fatty acid methyl ester.

15. The brine-tolerant lubricant of claim 1, wherein:
(A) the oil component consists essentially of soy fatty acid methyl ester;
(B) the surfactant component consists essentially of 24-3 ethoxylated linear alcohol; and
(C) the brine-tolerant lubricant includes the additive component, and the additive component consists essentially of cocamide diethanolamine.

16. The brine-tolerant lubricant of claim 1, wherein:
(A) the oil component consists essentially of soy fatty acid methyl ester;
(B) the surfactant component consists essentially of 24-3 ethoxylated linear alcohol; and
(C) the brine-tolerant lubricant includes the additive component, and the additive component consists essentially of sulfurized vegetable fatty acid methyl ester.

17. The brine-tolerant lubricant of claim 1, wherein:
(A) the oil component consists essentially of a combination of soy fatty acid methyl ester and coconut fatty acid methyl ester;
(B) the surfactant component consists essentially of 24-3 ethoxylated linear alcohol; and
(C) the brine-tolerant lubricant includes the additive component, and the additive component consists essentially of cocamide diethanolamine.

18. The brine-tolerant lubricant of claim 1, wherein:
(A) the oil component consists essentially of a combination of soy fatty acid methyl ester and coconut fatty acid methyl ester;
(B) the surfactant component consists essentially of 24-3 ethoxylated linear alcohol; and
(C) the brine-tolerant lubricant includes the additive component, and the additive component consists essentially of sulfurized vegetable fatty acid methyl ester.

19. The brine-tolerant lubricant of claim 1, wherein:
(A) the oil component consists essentially of soy fatty acid methyl ester;
(B) the surfactant component consists essentially of ethoxylated soy fatty acid; and
(C) the brine-tolerant lubricant includes the additive component, and the additive component consists essentially of cocamide diethanolamine.

20. The brine-tolerant lubricant of claim 1, wherein:
(A) the oil component consists essentially of soy fatty acid methyl ester;
(B) the surfactant component consists essentially of ethoxylated soy fatty acid; and
(C) the brine-tolerant lubricant includes the additive component, and the additive component consists essentially of sulfurized vegetable fatty acid methyl ester.

* * * * *